United States Patent
Chanez et al.

(10) Patent No.: US 9,091,207 B2
(45) Date of Patent: Jul. 28, 2015

(54) GAS TURBINE ENGINE AIR INTAKE IN A NACELLE

(75) Inventors: Philippe Gerard Chanez, Paris (FR);
Gaetan Jean Mabboux,
Boulogne-Billancourt (FR); Philippe Gilles Minot, Brussels (BE); Thomas Alain Christian Vincent, Crosne (FR);
Didier Jean-Louis Yvon, Savigny sur Orge (FR)

(73) Assignee: SNECMA, Paris (FR)

( * ) Notice: Subject to any disclaimer, the term of this patent is extended or adjusted under 35 U.S.C. 154(b) by 628 days.

(21) Appl. No.: 13/502,294

(22) PCT Filed: Oct. 14, 2010

(86) PCT No.: PCT/EP2010/065416
§ 371 (c)(1),
(2), (4) Date: Apr. 16, 2012

(87) PCT Pub. No.: WO2011/045373
PCT Pub. Date: Apr. 21, 2011

(65) Prior Publication Data
US 2012/0207594 A1    Aug. 16, 2012

(30) Foreign Application Priority Data

Oct. 16, 2009  (FR) .................................... 09 57275
Oct. 16, 2009  (FR) .................................... 09 57277

(51) Int. Cl.
*F02C 7/052*    (2006.01)
*B64D 33/02*    (2006.01)
(Continued)

(52) U.S. Cl.
CPC . *F02C 7/05* (2013.01); *B64D 33/02* (2013.01);
*F02C 7/052* (2013.01); *F02C 7/20* (2013.01);
*F02K 3/062* (2013.01); *F02K 3/072* (2013.01);
*B64D 2027/005* (2013.01); *B64D 2033/022* (2013.01); *B64D 2033/0293* (2013.01); *F05D 2250/292* (2013.01); *F05D 2250/70* (2013.01);
*F05D 2260/607* (2013.01); *Y02T 50/66* (2013.01); *Y02T 50/671* (2013.01); *Y02T 50/675* (2013.01)

(58) Field of Classification Search
USPC ..................... 415/121.2, 169.1, 144, 208.1;
60/39.092; 244/53 B
See application file for complete search history.

(56) References Cited

U.S. PATENT DOCUMENTS 4,456,458 A * 6/1984 Gilbertson ...................... 55/306
4,527,387 A   7/1985 Lastrina et al.
(Continued)

FOREIGN PATENT DOCUMENTS

EP    0 394 102    10/1990
EP    1 898 068    3/2008
(Continued)

OTHER PUBLICATIONS

International Search Report issued on Mar. 1, 2011 in PCT/EP10/65416 filed on Oct. 14, 2010.

*Primary Examiner* — Dwayne J White
*Assistant Examiner* — Justin Seabe
(74) *Attorney, Agent, or Firm* — Oblon, McClelland, Maier & Neustadt, L.L.P.

(57) ABSTRACT

An assembly including a gas turbine engine and a nacelle in which the engine is housed, the nacelle including an air intake fairing that forms an air inlet and includes: a member for deflecting foreign objects, which together with the fairing, forms an air intake duct; and, downstream from the deflecting member, a secondary deflecting channel, and a main channel for supplying air to the engine. The air intake duct is configured to deflect at least some of the foreign objects sucked in through the air inlet towards the secondary deflecting channel. The secondary deflecting channel is shaped such that the flow velocity of the air flowing therethrough increases from upstream to downstream, the secondary channel having an outlet with an opening leading into the outer wall of the nacelle.

13 Claims, 5 Drawing Sheets

(51) Int. Cl.
*F02C 7/05* (2006.01)
*F02C 7/20* (2006.01)
*F02K 3/062* (2006.01)
*F02K 3/072* (2006.01)
*B64D 27/00* (2006.01)

(56) References Cited

U.S. PATENT DOCUMENTS

| | | |
|---|---|---|
| 4,685,942 A | 8/1987 | Klassen et al. |
| 4,825,648 A | 5/1989 | Adamson |
| 4,881,367 A | 11/1989 | Flatman |
| 5,058,379 A | 10/1991 | Lardellier |
| 2008/0253881 A1 | 10/2008 | Richards |

FOREIGN PATENT DOCUMENTS

| | | |
|---|---|---|
| FR | 2 536 789 | 6/1984 |
| FR | 2 538 452 | 6/1984 |
| GB | 697 006 | 9/1953 |
| GB | 2 202 588 | 9/1988 |
| GB | 2 203 801 | 10/1988 |

\* cited by examiner

GAS TURBINE ENGINE AIR INTAKE IN A NACELLE

BACKGROUND OF THE INVENTION

1. Field of the Invention

The present invention relates to the field of aeronautical turbine engines and is aimed in particular at the air inlet of the turbine engine, the latter comprising the engine itself and the nacelle in which it is housed.

2. Description of the Related Art

A turbine engine generally comprises a gas generator formed of one or more sets of rotors rotating about one and the same axis. Each set, known as a spool, is made up of a compressor and of a turbine which are usually connected by a shaft or drum, and are arranged one upstream and the other downstream of a combustion chamber in relation to the flow of gases through the engine. Associated with this gas generator is a fan or a simple or multiple set of fan blades that it drives.

When the rotor of the fan or set of fan blades is positioned in front of the engine, the air inlet of the generator is situated downstream of this rotor. Foreign bodies, such as birds, hail, water and stones, liable to be absorbed by the generator are at least partially slowed or halted by the front rotor which, because of its inertia and its size, partially forms a screen, or are deflected by a centrifugal effect of the fan toward the secondary flow path. Such protection does not exist on engines the fan or set of fan blades rotor of which is not positioned upstream of the gas generator air inlet.

Such is the case of an unducted fan, or UDF, engine or of an "open rotor" engine. This type of engine comprises a pair of sets of fan blades, which are contrarotatory, and arranged radially on the outside of the nacelle enveloping the generator, in line with two turbine impellers by which they are directly driven. The gas generator is a single flow generator. This type of engine is discussed in the patent application FR 2 606 081 in the name of the Applicant company.

One solution might be to strengthen the first compressor stages, but such reinforcement would lead to a sizing of the elements which is somewhat unfavorable in terms of mass and size, because these need to be capable of withstanding direct impacts.

BRIEF SUMMARY OF THE INVENTION

It is an object of the invention to produce an air inlet that would reduce the energy of impact of bulky objects in such a way that when these reach the compressor they have lost enough energy that they do not damage the components of that compressor.

Another object of the invention is to produce an air inlet able to deflect objects of smaller size such as grains of sand, ice, stones and water and discharge them without losing too much energy.

Specially designed air inlets for engines fitted to helicopters or to vertical take-off and landing (VTOL) aircraft are known. These for example comprise means that deflect the air flow at the inlet with, downstream of the deflection point, means that trap ingested objects, notably sand.

The present invention is aimed at an air inlet that is an improvement over the air inlets of the prior art and protect the engine against the ingestion of foreign objects while at the same time maintaining the aerodynamic performance of the nacelle.

The invention proposes an assembly of a gas turbine engine and of a nacelle in which it is housed with an air inlet fairing forming an air inlet comprising:
- a foreign-object deflection member which, with said fairing, forms an air intake duct and, downstream of the deflection member,
- a secondary deflection passage,
- a main engine air supply passage, said air intake duct being designed to deflect at least some of the foreign objects that have been aspirated by the air inlet toward the secondary deflection passage, characterized in that the secondary deflection passage is configured in such a way that the speed at which the air passing through it flows is increased from upstream to downstream, the secondary passage having an outlet with an opening that opens out in the exterior wall of the nacelle.

Through the invention, it is thus possible to maintain aerodynamic performance and limit the overall drag of the nacelle. Thus, the cross section of the secondary passage, transverse to the direction in which the air flows, is of an area that decreases between the inlet and the outlet of the secondary passage.

According to one advantageous embodiment, the reduction in cross sections is azimuthal. More specifically, the secondary deflection passage is formed of at least two separate ducts with an annular inlet that is common and outlets with openings distributed around the periphery of the nacelle.

The air discharge opening section in the wall of the nacelle is preferably configured so that the airflow is directed along the axis of the engine.

The foreign-object deflection member preferably conceals the main passage from any ballistic trajectory passing through the air inlet. According to one advantageous embodiment it is in the shape of an axisymmetric bullet which forms an annular air intake passage with the air inlet fairing which is likewise of annular shape.

According to one embodiment, the secondary deflection passage is formed of at least two separate ducts with an annular inlet that is common and outlets with openings distributed around the periphery of the nacelle. For example, the secondary passage may comprise four ducts or five or more.

According to another embodiment, in an assembly formed of a gas turbine engine and of a nacelle in which it is housed, the nacelle comprising an air inlet fairing and a removable cowling element in the continuation of said air inlet fairing, said assembly is characterized in that the secondary deflection passage comprises at least one portion of secondary passage that forms a deflection scoop and is secured to said removable cowling element.

This solves the problem of installing one or more object-deflection ducts while at the same time maintaining satisfactory aerodynamic performance in an engine environment that is tight on space. The solution allows an isostatic arrangement to be maintained, that transmits the least possible amount of load through said secondary passage portion that forms the deflection scoop.

Further, the solution allows an engine weight saving by comparison with an embodiment in which the engine has to be capable of withstanding the impacts directly.

This solution is well suited to an assembly in which the cowling element is articulated about an axis parallel to the axis of the engine so as to uncover the engine.

This solution makes maintenance easier: with the cowlings open, the duct portion or portions do not impede gas turbine engine maintenance. The air inlet components liable to be impacted can be inspected. They can be removed and easily exchanged in the event of impact.

According to one preferred embodiment, the assembly of a gas turbine engine and of a nacelle has a deflection member in the shape of an axisymmetric bullet which forms an annular air intake passage with the air inlet fairing which is likewise of annular shape, the deflection member being supported at least in part by a first casing having an internal hub, by being engaged in said internal hub.

More particularly, said first hub casing is fixed to the engine and notably the first hub casing is fixed to the engine by means of a second hub casing.

Using this embodiment, the life and reliability of the assembly is optimized, the load paths and assembly being simple.

Advantageously, the second hub casing forms a plane for suspending the engine from an aircraft.

The assembly of the invention also comprises the following features considered alone or in combination:

With the cowling element being articulated about an axis parallel to the axis of the engine so as to uncover the engine, the portion of secondary deflection passage secured to the articulated cowling element has upstream surfaces that press in a fluidtight manner against bearing surfaces forming the secondary passage inside the air inlet fairing. In particular, said bearing surfaces are formed on the hub casing.

The secondary passage is configured in such a way that the speed at which the air passing through it flows is increased from upstream to downstream, the secondary passage having an outlet opening into the exterior wall of the nacelle. This increase in speed is obtained by reducing the cross section of the secondary passage transversally to the direction in which the air flows between the inlet and the outlet of the secondary passage. This reduction in transverse cross section is preferably azimuthal so as to obtain outlet orifices which are distributed at the surface of the nacelle.

The foreign-object deflection member preferably conceals the main passage from any ballistic trajectory passing through the air inlet. This avoids the direct ingestion of any foreign object into the engine.

The invention is aimed more specifically at engines of the unducted fan type, the sets of fan blades being arranged downstream of the engine inlet.

BRIEF DESCRIPTION OF THE SEVERAL VIEWS OF THE DRAWINGS

The invention will be better understood and other objects, details, features and advantages thereof will become clearly apparent during the course of the detailed explanatory description which follows, of one or more embodiments of the invention which are given by way of purely illustrative and nonlimiting examples with reference to the attached schematic drawings. In these drawings.

DETAILED DESCRIPTION OF THE INVENTION

Figure 1:
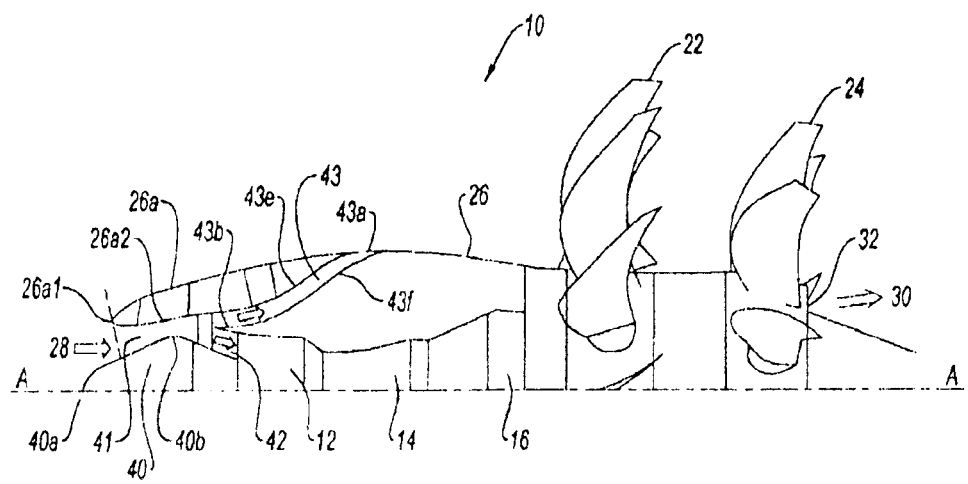
FIG. 1 is a schematic partial axial section of a turbine engine of the unducted fan type, the air inlet of which is an air inlet according to the invention.

Reference is made first of all to FIG. 1 which depicts the main constituent parts of an unducted fan turbine engine 10. From upstream to downstream, in the direction in which the gases flow within the turbine engine, it comprises a compressor 12, an annular combustion chamber 14, a high-pressure turbine 16 only the casings of which are visible. Downstream of the high-pressure turbine 16 are two low-pressure turbines, not visible, which are contrarotatory, which means to say that they rotate in opposite directions about the longitudinal axis A of the engine.

Each of these downstream turbines rotates as one with an external set of fan blades 22, 24 extending radially on the outside of the nacelle 26 of the turbine engine, this nacelle 26 being substantially cylindrical and extending along the axis A from the air inlet around the compressor 12, the combustion chamber 14 and the turbines.

The flow of air 28 that enters the engine is compressed and then mixed with fuel and burnt in the combustion chamber 14, the combustion gases then passing through the turbines to drive the rotation of the sets of fan blades 22, 24 which provide most of the thrust generated by the turbine engine. The combustion gases leaving the turbines are expelled through a jet pipe 32 (arrows 30) to increase the thrust.

The sets of fan blades 22, 24 are arranged coaxially one behind the other and comprise a plurality of blades evenly distributed about the axis A of the turbine engine. These blades extend substantially radially and are of the variable-pitch type, which means that they are able to rotate about their axes in order to optimize their angular position according to the operating conditions of the turbine engine.

The nacelle 26 comprises an upstream air inlet fairing 26a of annular shape. A foreign-object deflection member 40 is positioned inside the air inlet fairing 26a. With the interior wall 26a2 of the air inlet fairing 26a it delimits an air inlet passage 41 for the engine. This passage 41 in this instance is annular. The object-deflection member is of ovoid overall shape, its axis co-linear with the axis AA of the engine. One vertex 40a of the ovoid points upstream of the upstream edge 26a1 of the fairing 26a. The deflection member has a maximum diameter on its widened part at 40b downstream of the edge 26a1. The deflection member is advantageously supported by a hub casing, not depicted, the arms of which radiate out between an interior hub in which the deflection member is mounted and an exterior shell ring.

Downstream of the widened part 40b, the air inlet passage 41 widens and splits into two concentric passages: an interior main passage 42 and a secondary passage 43 exterior to the previous one. The main passage 42 leads to the inlet of the compressor 12 and supplies the engine with primary air. The secondary passage 43 leads into the nacelle 26 on the outside of the various casings of the engine. It opens into the wall of the nacelle 26 through an opening 43a therein.

The passage is delimited by two radial or substantially radial walls $43_2c$ and $43_2d$ which extend longitudinally between the edge $43b$ and the opening $43a$, and by two walls in the form of cylinder portions, a radially interior wall $43f$ and a radially exterior wall $43e$. The latter is in the continuation of the interior wall $26a2$ of the air inlet fairing $26a$.

According to the embodiment depicted, the engine comprises two secondary passages $43_2$ and $43_2'$ extending from the upstream edge $43b$ of the surface that splits the incoming airflow between the two, main 42 and secondary 43, passages. According to one feature of the invention, the secondary passages $43_2$ and $43_2'$ have a cross section transverse to the direction of the flow which decreases progressively from the flow separation edge $43b$. This reduction in cross section leads to an increase in the speed of the air in the secondary passage 43. Thus on the one hand, any ingestion of air through the outlet openings $43a$ of the secondary passage 43 is avoided and on the other hand, the airflow contributes toward propulsion.

For preference, the reduction in cross section transverse to the direction of flow from upstream to downstream is obtained by an azimuthal reduction in cross section, the separation between the two longitudinal walls $43_2c$ and $43_2d$ decreasing progressively between the edge $43b$ and the opening $43_2a$. The radial thickness, between the two cylinder portions, of the secondary passage for deflecting the foreign objects is constant or substantially constant from the inlet corresponding to the edge $43b$ as far as the opening $43_2a$. As may be seen in FIG. 2, the opening $43a$ of each passage 43 extends over a circumferential width that is very much smaller than that of the inlet defined by a part of the edge $43b$ and which extends over half a circumference thereof.

The function of the various elements that make up this air inlet is as follows. If a foreign object is aspirated in flight through the air inlet it strikes the deflection member 40 off which it ricochets. Its path is deflected toward the interior wall of the inlet fairing. Downstream of the widened part of the deflection member, the object is directed toward one of the deflection passages $43_2$ or $43_2'$ whence it is led out through the opening $43a$.

The deflection member is advantageously supported by a first hub casing 51 the arms of which radiate out between an interior hub in which the deflection member is mounted and an external shell ring. The first hub casing 51 is itself supported by a second hub casing 52 positioned downstream. This second casing 52 is fixed to the engine, for example to the casing of the compressor 12.

Figure 3:
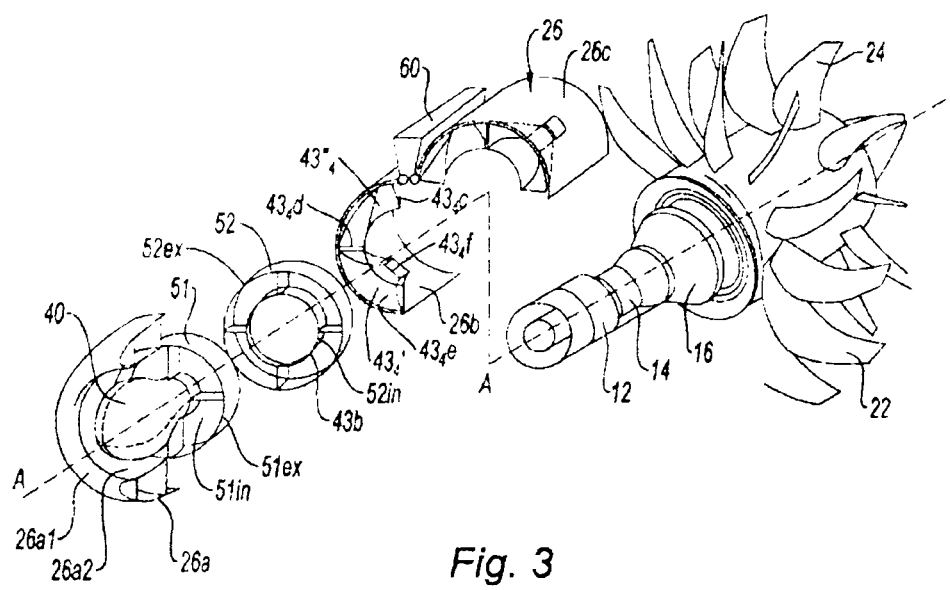
FIG. 3 is an exploded perspective view of the assembly of the engine and of its nacelle according to another embodiment, in which the scoops are incorporated into a nacelle comprising two cowlings articulated about longitudinal axes.

FIG. 3 depicts an exploded perspective view of the assembly of FIG. 1, according to an alternative form of embodiment involving four scoops. The nacelle 26 comprises, downstream of the air inlet fairing 26a, a cowling formed of two cowling elements 26b and 26c articulated to the pylon 60 via which the assembly is attached to the aircraft. The elements are each articulated about an axis parallel to the axis AA of the engine. According to the embodiment depicted, each cowling element 26b or 26c supports two scoops, one a top scoop $43_4'$, the other a bottom scoop $43_4''$. The four scoops are portions of secondary passage 43. Here they have identical profiles because they are arranged symmetrically about the engine axis.

A scoop $43_4'$ or $43_4''$ of the secondary passage 43 is delimited by two radial or substantially radial walls $43_4c$ and $43_4d$ which extend longitudinally between the edge $43b$ and the opening $43_4a$ and by two walls in the form of cylinder portions, one being a radially interior wall $43_4f$ and the other a radially exterior wall $43_4e$. The latter is in the continuation of the interior wall $26a2$ of the air inlet fairing $26a$ when the cowling is closed. The scoops extend from the upstream edge $43b$ of the surface that splits the incoming airflow between the two, main 42 and secondary 43, passages.

According to one feature of the invention, the scoops of the secondary passage 43 have a cross section transverse to the direction of flow which decreases progressively from the edge $43b$ that separates the flows. This reduction in cross section leads to an increase in the speed of the air in the secondary passage 43. Thus, on the one hand any ingestion of air through the outlet openings $43_4a$ of the secondary passage 43 is avoided, and on the other hand the air flow contributes toward propulsion.

Figure 2:
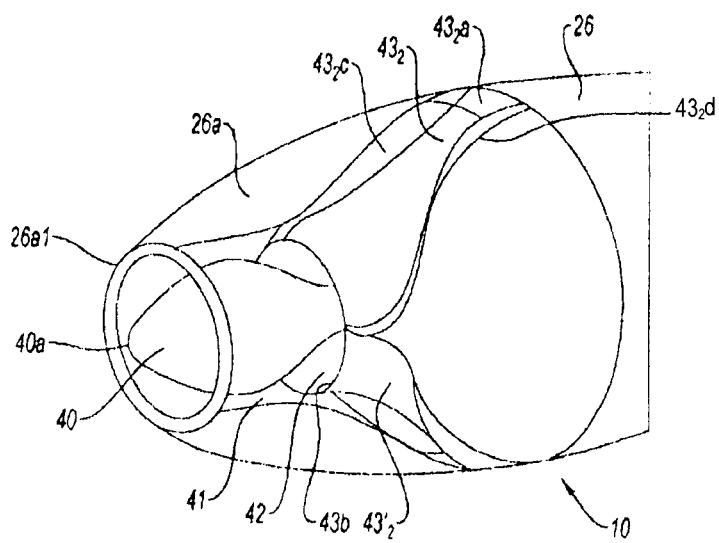
FIG. 2 is a perspective view of the air inlet of figure 1 and shows the elements of the air inlet with hidden detail according to a first embodiment.
Figure 4:
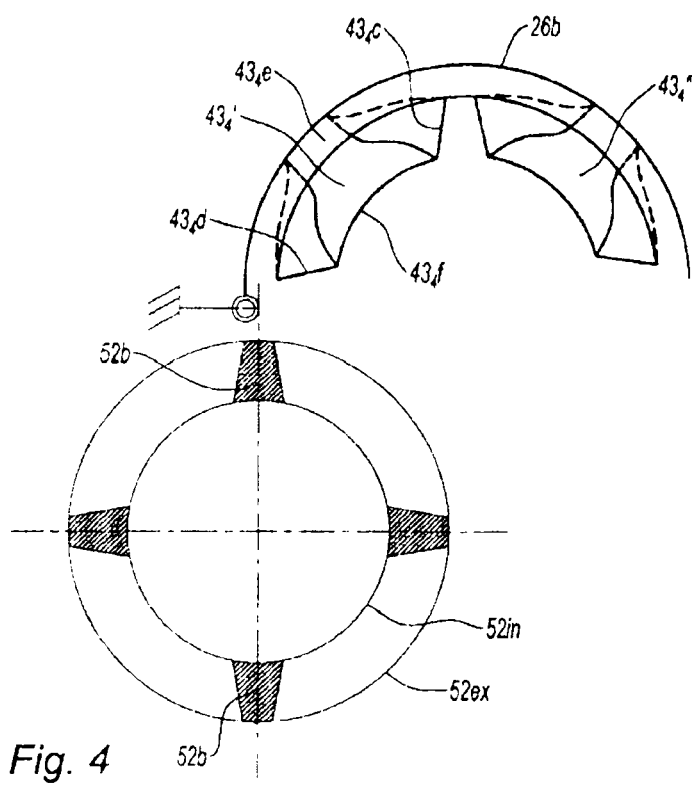
FIG. 4 is a view in section of the embodiment of FIG. 3, showing the interface between the second hub casing and the cowling elements, with the cowling open.
Figure 5:
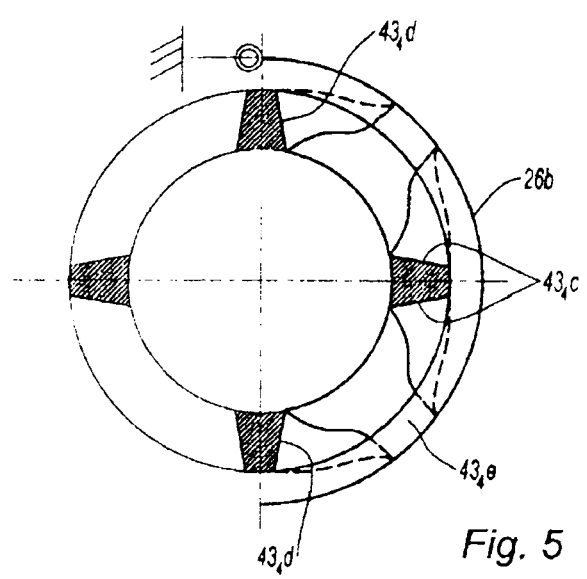
FIG. 5 is a view in cross section of the embodiment of FIG. 3, showing the interface between the second hub casing and the cowling elements, with the cowling closed.

For preference, the reduction in cross section transverse to the direction of flow from upstream to downstream is obtained by an azimuthal reduction in cross section, the separation between the two longitudinal walls $43_4c$ and $43_4d$ decreasing progressively between the edge $43b$ and the opening $43_4a$. The radial thickness, between the two cylinder portions, of the scoops is constant or substantially constant from the inlet corresponding to the edge $43b$ as far as the opening $43a$. As can be seen in FIG. 2, the opening $43_4a$ of each scoop $43_4'$ or $43_4''$ extends over a circumferential width very much smaller than that of the inlet defined by a part of the edge $43b$ and which extends over a quarter of the circumference thereof. FIGS. 4 and 5 show a cowling element 26b in the closed position, FIG. 4, and in the open position, figure 5 allowing the engine to be inspected.

According to another feature of the invention, the deflection member 40 is supported by the engine by means of two hub casings 51 and 52. The first hub casing 51 is formed of an interior hub $51in$ and of an exterior hub or shell ring $51ex$, which are connected by radial arms $51b$. The space between the two hubs $51in$ and $51ex$ defines the opening of the air inlet passage 41. The interior hub $51in$ holds the bullet of the deflection member 40. The second hub casing 52 likewise comprises an interior hub $52in$ and an exterior hub $52ex$ which are connected by radial arms $52b$. The second hub casing 52 defines part of the secondary passage 43.

Figure 6:
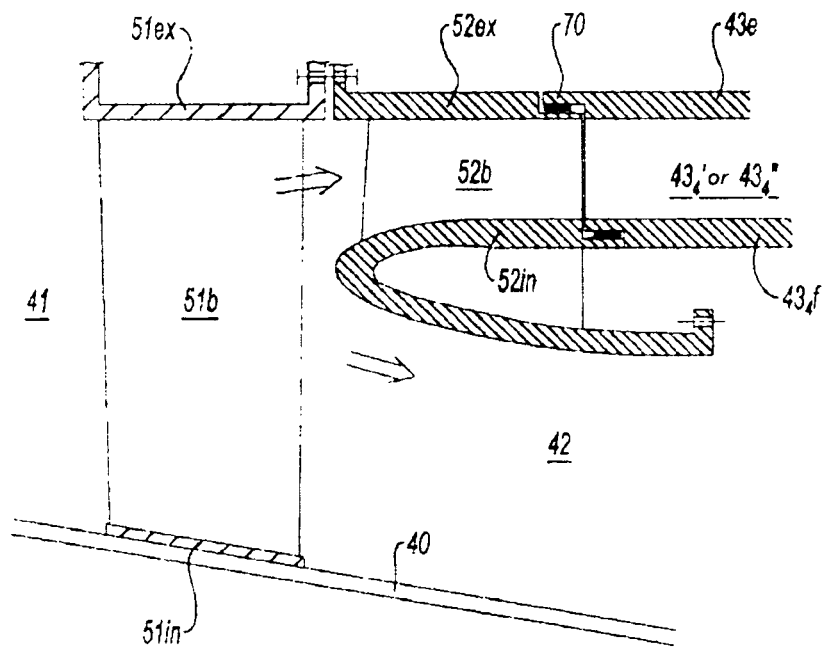
FIG. 6 is a cross section of FIG. 4, passing through the axis of the machine.

FIG. 6, which is a partial longitudinal sectioned view of FIG. 5, shows the layout of two hub casings. The two casings 51 and 52 are joined together by bolting together their respective exterior shell ring $51ex$ and $52ex$. The interior hub $52in$ of the second hub casing is itself secured to the engine casing, for example to the casing of the compressor 12 which cannot be seen in FIG. 6. In this way, the deflection member 40 is held on the downstream gas turbine engine. This form of assembly avoids any vibration thereof.

Figure 7:
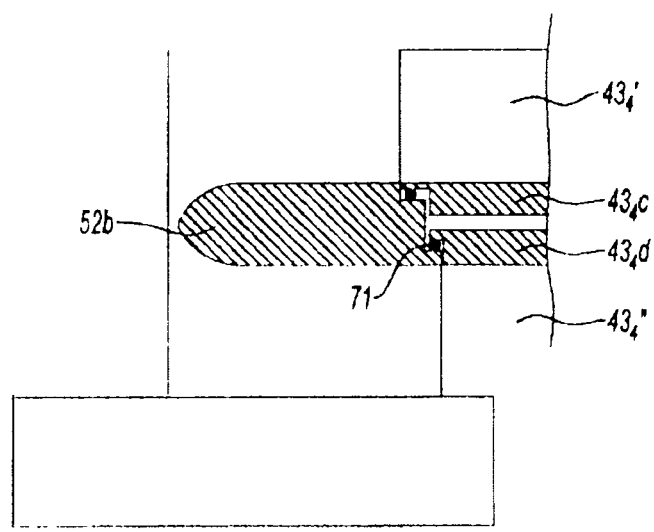
FIG. 7 is a cross section of FIG. 4 not passing through the axis of the machine.

As can be seen in FIGS. 4 and 5, the cowling element 26b or 26c is articulated about an axis parallel to the axis AA. The scoops are positioned in the downstream continuation of the second casing 52 and are configured in such a way as to allow a fluidtight assembly between the second hub casing 52 and the scoops $43_4'$ or $43_4''$. In relation to FIGS. 6 and 7 which are respectively views in longitudinal section passing through the axis and not passing through the axis of the secondary passage, sealing between the casing 52 and the scoops $43_4'$ and $43_4''$ is afforded as follows.

Seals 70 are interposed between the downstream continuations of the two hub shell rings $52ex$ and $52in$ and the upstream continuations of the two cylindrical walls $43_4e$ and $43_4f$ of the scoops $43_4'$ and $43_4''$. These are, for example, lip seals.

As may be seen in FIG. 6, seals are interposed between the lateral walls $43_4c$ and $43_4d$ of the scoops and the flanks of the radial arms $52b$ of the hub casing 52. It may be seen that, for preference, the lateral walls $43_4c$ and $43_4d$ of the scoops are inclined with respect to the normal to the cylindrical walls in order to center the scoops with respect to the radial arms 52*b*.

The way in which the various elements that make up this air inlet work is as follows. If a foreign object is aspirated in flight by the air inlet it strikes the deflection member 40 off which it ricochets. Its trajectory is deflected toward the interior wall of the inlet fairing 26*a*. Downstream of the widened part of the deflection member, the object is directed toward one of the scoops of the deflection passage 43$_4$' or 43$_4$" whence it is led out through the opening 43$_4$*a*. If, as a result of ricochet, it is aspirated into the main passage, it has lost enough energy that it does not damage the engine.

According to one alternative form of embodiment, depicted in FIG. 6, of the second hub casing, the latter is designed to form what is known as the intermediate casing in the engine front suspension plane.

Figure 8:
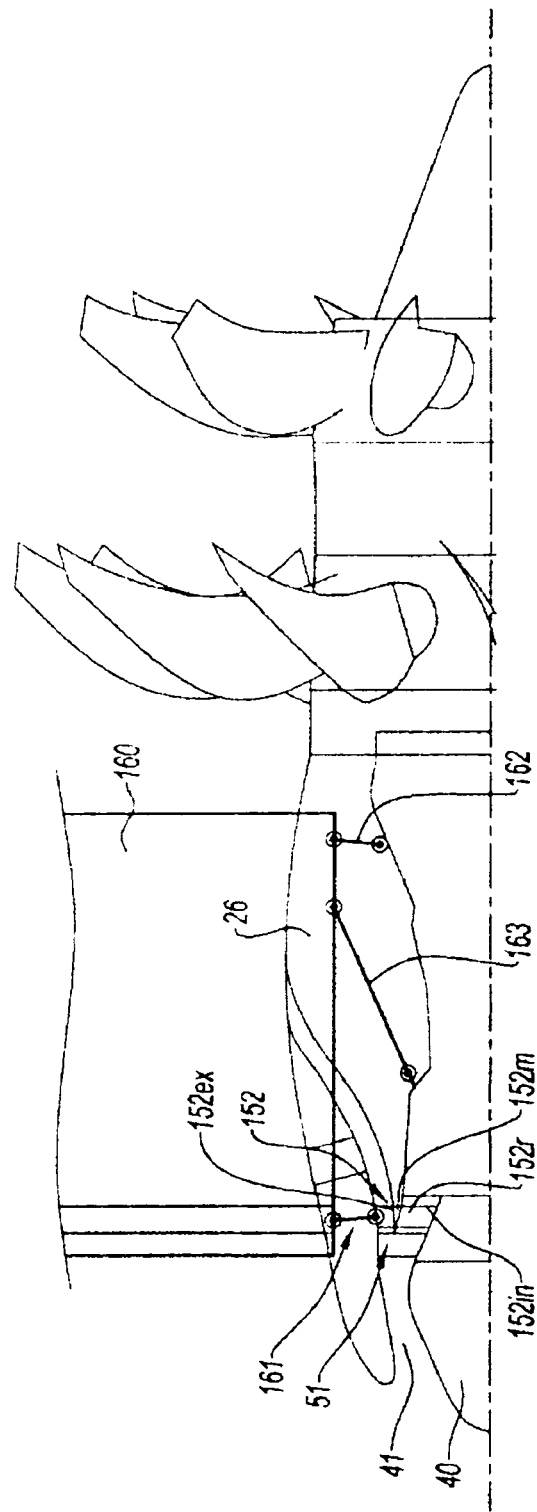
FIG. 8 is a schematic partial axial section of a turbine engine of the unducted fan type with an alternative form of embodiment of the invention regarding the second hub casing.

The engine of FIG. 8 is the same as that of FIG. 1. The difference lies in the second hub casing referenced 152. This second hub casing 152 comprises an interior hub 152*in* forming a support for the front bearing of the engine shaft. It comprises a middle hub 152*m* corresponding to the interior hub of the hub casing of the previous embodiment and an exterior hub 152*ex* corresponding to the exterior hub of the preceding embodiment. The front attachment means 161 for attaching the engine to the aircraft are attached to this exterior hub 152*ex*. One example of an engine suspension has been depicted schematically. It comprises a pylon 160 which at one end is attached to the aircraft and to which the engine is secured. The attachment of the engine comprises said front attachment 161, a rear attachment 162 in the rear suspension plane and thrust rods 163. The air intake passage 42 is defined between the two, interior 161*in* and middle 152*m*, hubs between which the vanes 152*r* of the first, flow-straightening, stage of the compressor are formed.

The invention claimed is:

1. An assembly of a gas turbine engine and of a nacelle in which the gas turbine engine is housed, the nacelle comprising an air inlet fairing forming an air inlet comprising:
    a foreign-object deflection member positioned inside the air inlet fairing, the deflection member and an interior wall of the air inlet fairing delimiting an air intake duct;
    a secondary deflection passage disposed downstream of the deflection member and including an inlet and an outlet opening via opening in an exterior wall of the nacelle;
    a main engine air supply passage disposed downstream of the deflection member and leading to an inlet of a compressor of the gas turbine engine, the main engine air supply passage being concentric with and inside of the secondary deflection passage;
    said air intake duct being configured to deflect at least some foreign objects that have been aspirated by the air inlet toward the secondary deflection passage,
    wherein an upstream edge of a surface splits the air inlet between the secondary deflection passage and the main engine air supply passage,
    wherein the secondary deflection passage is delimited by first and second substantially radial walls extending longitudinally between the inlet and the outlet, a radially interior cylindrical wall, and a radially exterior cylindrical wall in continuation with the interior wall of the air inlet fairing, the walls delimiting the secondary deflection passage being fixed relative to each other, and
    wherein an area of a cross section of the secondary deflection passage, transverse to a direction in which the air flows, progressively decreases between the inlet and the outlet of the secondary deflection passage such that a speed at which the air passing through the secondary deflection passage flows is increased from upstream to downstream.

2. The assembly of a gas turbine engine and of a nacelle as claimed in claim 1, wherein the foreign-object deflection member blocks any ballistic trajectory passing through the air inlet from entering the main engine air supply passage.

3. The assembly of a gas turbine engine and of a nacelle as claimed in claim 1, wherein the deflection member is in a shape of an axisymmetric bullet which forms an annular air intake passage with the air inlet fairing which is of annular shape.

4. The assembly of a gas turbine engine and of a nacelle as claimed in claim 1, the decrease of the area of the cross section of the secondary passage, transverse to the direction in which the air flows, between the inlet and the outlet of the secondary passage is achieved by azimuthal reduction.

5. The assembly of a gas turbine engine and of a nacelle as claimed in claim 1, wherein the secondary deflection passage is formed of at least two separate ducts with an annular inlet that is common and outlets with openings distributed around the periphery of the nacelle.

6. The assembly of a gas turbine engine and of a nacelle as claimed in claim 1, wherein an air discharge opening in the wall of the nacelle is configured such that the airflow is directed along the axis of the engine.

7. The assembly of a gas turbine engine and of a nacelle as claimed in claim 1, wherein the nacelle comprises a removable cowling element in the continuation of said air inlet fairing, and
    wherein the secondary deflection passage comprises at least one portion of the secondary deflection passage that forms a deflection scoop and is secured to said removable cowling element.

8. The assembly of a gas turbine engine and of a nacelle as claimed in claim 7, further comprising a removable cowling element articulated about an axis parallel to the axis of the engine so as to uncover the engine.

9. The assembly of a gas turbine engine and of a nacelle as claimed in claim 1, wherein the object deflection member is in a shape of an axisymmetric bullet which forms an annular air intake passage with the air inlet fairing which is of annular shape, the deflection member being supported at least in part by a first hub casing including an internal hub, by being engaged in said internal hub.

10. The assembly of a gas turbine engine and of a nacelle as claimed in claim 9, wherein said first hub casing is fixed to the engine by a second hub casing that forms a plane for suspending the engine from an aircraft.

11. The assembly of a gas turbine engine and of a nacelle as claimed in claim 10, further comprising a cowling element articulated about an axis parallel to the axis of the engine so as to uncover the engine, a portion of the secondary deflection passage secured to the articulated cowling element having upstream surfaces that press in a fluidtight manner against bearing surfaces forming the secondary deflection passage inside the air inlet fairing.

12. The assembly of a gas turbine engine and of a nacelle as claimed in claim 11, wherein said bearing surfaces are formed on the second hub casing.

13. The assembly of a gas turbine engine and of a nacelle as claimed in claim 11, wherein fan blades of the gas turbine engine are disposed downstream of the outlet of the secondary deflection passage.

* * * * *